United States Patent
Lee et al.

(10) Patent No.: US 10,049,488 B2
(45) Date of Patent: Aug. 14, 2018

(54) APPARATUS AND METHOD OF TRAVERSING ACCELERATION STRUCTURE IN RAY TRACING SYSTEM

(71) Applicant: Samsung Electronics Co., Ltd., Suwon-si (KR)

(72) Inventors: Jaedon Lee, Yongin-si (KR); Youngsam Shin, Hwaseong-si (KR); Wonjong Lee, Seoul (KR); Seokjoong Hwang, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/722,887

(22) Filed: May 27, 2015

(65) Prior Publication Data

US 2015/0348308 A1    Dec. 3, 2015

(30) Foreign Application Priority Data

May 27, 2014    (KR) .................. 10-2014-0063725

(51) Int. Cl.
*G06T 15/06*    (2011.01)

(52) U.S. Cl.
CPC .......... *G06T 15/06* (2013.01); *G06T 2210/12* (2013.01); *G06T 2210/52* (2013.01)

(58) Field of Classification Search
None
See application file for complete search history.

(56) References Cited

U.S. PATENT DOCUMENTS

| | | | | |
|---|---|---|---|---|
| 8,284,188 | B1 * | 10/2012 | Lauterbach | G06T 15/06 345/419 |
| 8,289,324 | B1 * | 10/2012 | Laine | G06T 15/06 345/426 |
| 8,692,834 | B2 | 4/2014 | Peterson et al. | |
| 2008/0074417 | A1 | 3/2008 | Mejdrich et al. | |
| 2010/0060634 | A1 | 3/2010 | Wald et al. | |
| 2011/0148878 | A1 * | 6/2011 | Baikie | G06T 11/206 345/440 |
| 2012/0069023 | A1 | 3/2012 | Hur et al. | |

(Continued)

FOREIGN PATENT DOCUMENTS

| | | |
|---|---|---|
| JP | 2009-545044 A | 12/2009 |
| JP | 2012-502395 A | 1/2012 |

(Continued)

OTHER PUBLICATIONS

Ernst, et al.. "Embree: Photo-Realistic Ray Tracing Kernels." *White paper, Intel* (2011).

(Continued)

*Primary Examiner* — Andrew G Yang
(74) *Attorney, Agent, or Firm* — F. Chau & Associates, LLC

(57) ABSTRACT

A method of traversing an acceleration structure (AS) in a ray tracing system includes obtaining information about child nodes of a target node included in the AS; determining whether each of the child nodes intersects a ray based on the obtained information; determining a next target node among at least one child node that intersects the ray; and performing an operation corresponding to a type of the determined next target node.

20 Claims, 7 Drawing Sheets

(56) References Cited

U.S. PATENT DOCUMENTS

| | | | | |
|---|---|---|---|---|
| 2014/0168238 A1* | 6/2014 | Luebke | ............... | G06T 17/005 |
| | | | | 345/522 |
| 2014/0333623 A1* | 11/2014 | Ozdas | ................... | G06T 15/08 |
| | | | | 345/426 |
| 2014/0362074 A1* | 12/2014 | Karras | .................. | G06T 15/06 |
| | | | | 345/419 |

FOREIGN PATENT DOCUMENTS

| | | |
|---|---|---|
| JP | 4972642 B2 | 4/2012 |
| KR | 10-1004110 B1 | 12/2010 |
| KR | 10-1089638 B1 | 12/2011 |
| KR | 10-2014-0014487 A | 2/2014 |
| WO | WO 2007/002494 A2 | 1/2007 |
| WO | WO 2008/012199 A2 | 1/2008 |

OTHER PUBLICATIONS

Hapala, Michal, and Vlastimil Havran. "Review: Kd-tree Traversal Algorithms for Ray Tracing." Computer Graphics Forum. vol. 30. No. 1. Blackwell Publishing Ltd, 2011.

Santos, Artur, et al. "Understanding the efficiency of kD-tree ray-traversal techniques over a GPGPU architecture." *International Journal of Parallel Programming* 40.3 (2012): 331-352.

Lee, Won-Jong, et al. "SGRT: A mobile GPU architecture for real-time ray tracing." *Proceedings of the 5th high-performance graphics conference.* ACM, 2013.

Lee, Jaedon, et al. "Two-AABB traversal for mobile real-time ray tracing." *SIGGRAPH Asia 2014 Mobile Graphics and Interactive Applications.* ACM, 2014.

Extended European Search Report dated Oct. 30, 2015 in counterpart European Application No. 15169467.6 (7 pages, in English).

\* cited by examiner

```
typedef struct {
    int parent;      ─ 412
    int lchild;      ─ 414
    int rchild;      ─ 416
    short lprims_num; ─ 422
    short rprims_num; ─ 424
    float lc_bounds[2][3];  ─ 432
    float rc_bounds[2][3];  ─ 434
} BVHNode;
```

APPARATUS AND METHOD OF TRAVERSING ACCELERATION STRUCTURE IN RAY TRACING SYSTEM

CROSS-REFERENCE TO RELATED APPLICATIONS

This application claims the benefit of Korean Patent Application No. 10-2014-0063725 filed on May 27, 2014, in the Korean Intellectual Property Office, the entire disclosure of which is incorporated herein by reference for all purposes.

BACKGROUND

1. Field

This application relates to apparatuses and methods of traversing an acceleration structure in a ray tracing system.

2. Description of Related Art

In general, three-dimensional (3D) rendering is image processing for synthesizing 3D object data into an image seen from a given viewpoint of a camera.

Examples of rendering include rasterization, which generates an image by projecting a 3D object onto an image plane, and ray tracing, which generates an image by tracing a path of light incident along a ray through each pixel in an image plane from a viewpoint of a camera.

Of these two examples, ray tracing has an advantage in that it can generate a high-quality image because physical properties (e.g., reflection, refraction, and transmission) of light are reflected in a result of the ray tracing, but has a disadvantage in that it is difficult to perform the ray tracing at a high speed because a lot of computations need to be performed to perform the ray tracing.

Processes needing a lot of computations in ray tracing include a process of generating and traversing an acceleration structure (AS) in which scene objects to be rendered are spatially divided, and a process of performing an intersection test (IST) between a ray and a primitive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of traversing an acceleration structure (AS) in a ray tracing system includes obtaining information about child nodes of a target node included in the AS; determining whether each of the child nodes intersects a ray based on the obtained information; determining a next target node among at least one child node that intersects the ray; and performing an operation corresponding to a type of the determined next target node.

The determining of whether each of the child nodes intersects the ray may include simultaneously determining whether each of the child nodes intersect the ray based on the obtained information.

The determining of whether each of the child nodes intersects the ray may include simultaneously determining whether a first child node and a second child node intersect the ray based on obtained information about the first child node and the second child node.

The determining of the next target node may include, in response to there being only one child node that intersects the ray, determining the one child node as the next target node; and, in response to there being two or more child nodes that intersect the ray, determining a child node having a shortest intersection distance to the ray among the two or more child nodes as the next target node.

The determining of the next target node may include, in response to there being no child node that intersects the ray, extracting from the AS any one node among nodes that are not subordinate to the target node; and determining the extracted node as the next target node.

The performing of the operation corresponding to the type of the determined target node may include, in response to the next target node being an inner node, moving to at least one child node of the next target node; and, in response to the next target node being a leaf node, determining whether at least one primitive included in the leaf node intersects the ray.

The performing of the operation corresponding to the type of the determined next target node may further include, in response to the determining of whether the at least one primitive intersects the ray, traversing another child node that intersects the ray.

The determining of whether the at least one primitive included in the leaf node intersects the ray may include determining whether a preset bounding box of the at least one primitive included in the leaf node intersects the ray.

The method may further include, in response to the target node included in the root node being a leaf node, dividing at least one primitive included in the target node; and generating a child node of the target node based on the divided at least one primitive.

In another general aspect, a non-transitory computer-readable storage medium stores instructions for causing a computer to perform the method described above.

In another general aspect, an apparatus for traversing an acceleration structure (AS) in a ray tracing system includes an information obtainer configured to obtain information about child nodes of a target node included in the AS; an intersection tester configured to determine whether each of the child nodes intersects a ray based on the obtained information; and a controller configured to determine a next target node among at least one child node that intersects the ray, and perform an operation corresponding to a type of the determined next target node.

The intersection tester may be further configured to simultaneously determine whether each of the child nodes intersect the ray based on the obtained information.

The intersection tester may be further configured to simultaneously determine whether a first child node and a second child node intersect the ray based on obtained information about the first child node and the second child node.

The controller may be further configured to, in response to there being only one child node that intersects the ray, determine the one child node as the next target node; and, in response to there being two or more child nodes that intersect the ray, determine a child node having a shortest intersection distance to the ray among the two or more child nodes as the next target node.

The controller may be further configured to, in response to there being no child node that intersects the ray, extract any one node among nodes that are not subordinate to the target node from the AS, and determine the extracted node as the next target node.

The controller may be further configured to, in response to the next target node being an inner node, move to at least one child node of the next target node; and, in response to the next target node being a leaf node, determine whether at least one primitive included in the leaf node intersects the ray.

The controller may be further configured to, in response to the determining of whether the at least one primitive intersects the ray, traverse another child node that intersects the ray.

The intersection tester may be further configured to determine whether the least one primitive included in the leaf node intersects the ray by determining whether a preset bounding box of the at least one primitive included in the leaf node intersects the ray.

The controller may be further configured to, in response to the target node included in the root node being a leaf node, divide at least one primitive included in the target node, and generate a child node of the target node based on the divided at least one primitive.

In another general aspect, an apparatus for traversing an acceleration structure (AS) in a ray tracing system includes an information obtainer configured to simultaneously obtain information about all child nodes of a target node included in the AS; and an intersection tester configured to determine whether each of the child nodes intersects a ray based on the obtained information.

The intersection tester may be further configured to simultaneously determine whether each of the child nodes intersects the ray based on the obtained information.

The apparatus may further include a controller configured to determine a next target node based on an intersection testing result obtained by the intersection tester.

Other features and aspects will be apparent from the following detailed description, the drawings, and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
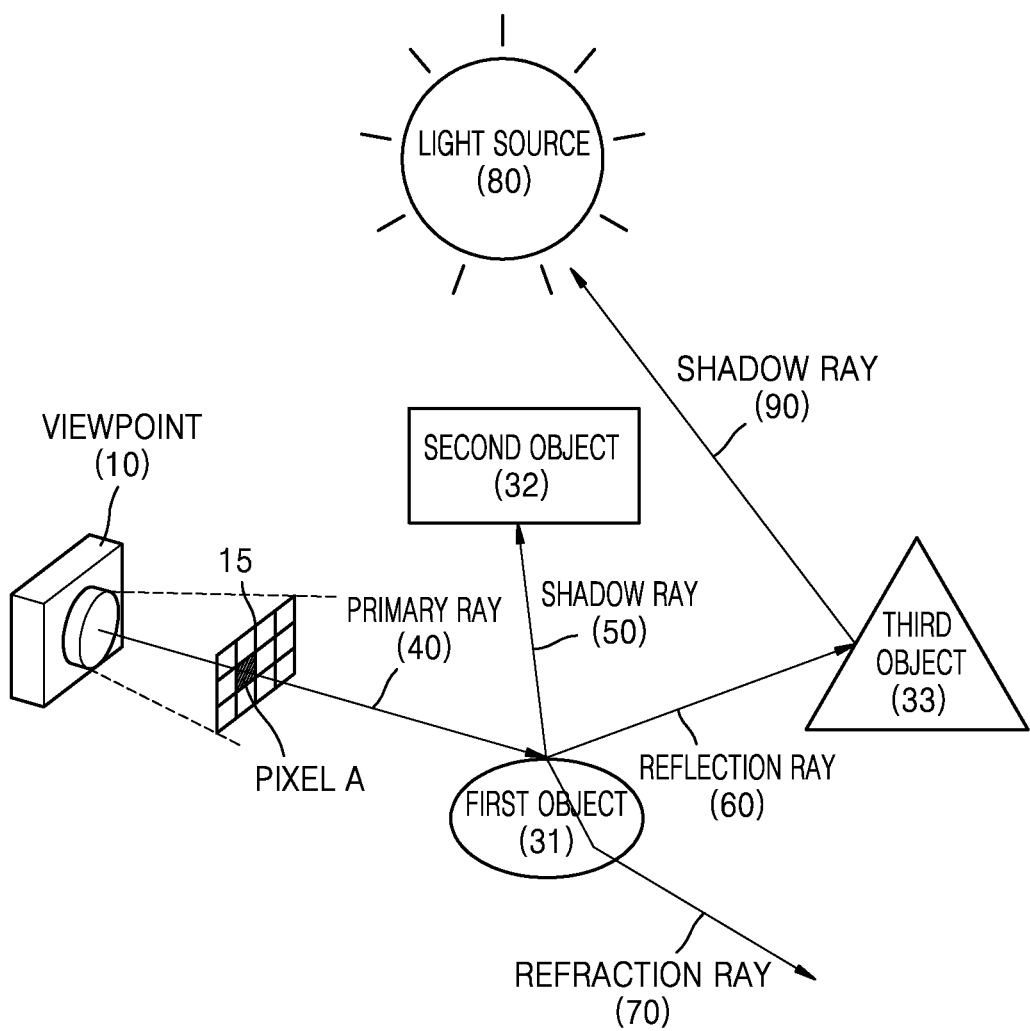
FIG. 1 is a view for explaining an example of ray tracing.

FIG. 1 is a view for explaining an example of ray tracing.

As shown in FIG. 1, a three-dimensional (3D) model includes a light source 80, a first object 31, a second object 32, and a third object 33. Although each of the first object 31, the second object 32, and the third object 33 is depicted as a two-dimensional (2D) object in FIG. 1 for simplicity, each of the first object 31, the second object 32, and the third object 33 is actually a 3D object.

In this example, it is assumed that the first object 31 has a reflectance and a refractive index that are greater than 0, and each of the second object 32 and the third object 33 has a reflectance and a refractive index that are 0. That is, it is assumed that the first object 31 reflects and refracts light, whereas the second object 32 and the third object 33 do not reflect and refract light.

In the 3D model of FIG. 1, a rendering apparatus (for example, a ray tracing apparatus 100 shown in FIG. 2) determines a viewpoint 10 from which to generate a 3D image, and determines an image plane 15 according to the determined viewpoint 10.

Once the viewpoint 10 and the image plane 15 are determined, the ray tracing apparatus 100 generates a ray for each pixel of the image plane 15 from the viewpoint 10.

For example, as shown in FIG. 1, when the image plane 15 has a resolution of 4×3=12 pixels, he ray tracing apparatus 100 generates a ray for each of the 12 pixels.

For simplicity of explanation, only a ray for one pixel (for example, a pixel A) will now be explained.

Referring to FIG. 1, a primary ray 40 is generated for the pixel A from the viewpoint 10. The primary ray 40 passes through a 3D space and reaches the first object 31. The first object 31 includes a set of predetermined unit regions (hereinafter, referred to as primitives), and the primitives may be polygons such as triangles or quadrangles or other polygons. The following explanation assumes that the primitives are triangles.

A shadow ray 50, a reflection ray 60, and a refraction ray 70 are generated at a hit point between the primary ray 40 and the first object 31. The shadow ray 50, the reflection ray 60, and the refraction ray 70 are referred to as secondary rays.

The shadow ray 50 is generated and applied from the hit point towards the light source 80. The reflection ray 60 is generated at an angle corresponding to an angle of incidence of the primary ray 40 and is assigned a weight according to a reflectance of the first object 31. The refraction ray 70 is generated at an angle corresponding to a refractive index of the first object 31 and the angle of incidence of the primary ray 40, and is assigned a weight according to the refractive index of the first object 31.

The ray tracing apparatus 100 determines whether the hit point is exposed through the shadow ray 50 to the light source 80. For example, as shown in FIG. 1, when the shadow ray 50 meets the second object 32, a shadow is formed at a hit point where the shadow ray 50 is generated.

Also, the ray tracing apparatus 100 determines whether the refraction ray 70 and the reflection ray 60 reach another object. For example, as shown in FIG. 1, there is no object in a direction in which the refraction ray 70 travels, and the reflection ray 60 reaches the third object 33. Accordingly, the ray tracing apparatus 100 checks coordinates and color information of a hit point of the third object 33, and generates a shadow ray 90 from the hit point of the third object 33. The ray tracing apparatus 100 then determines whether the shadow ray 90 is exposed to the light source 80.

Since the reflectance and the refractive index of each of the second object 32 and the third object 33 are 0, a reflection ray and a refraction ray for each of the second object 32 and the third object 33 are not generated.

As described above, the ray tracing apparatus 100 analyzes the primary ray 40 for the pixel A and all rays that are derived from the primary ray 40, and determines a color value of the pixel A according to a result of the analysis. The determination of the color value of the pixel A is affected by a color of a hit point of the primary ray 40, a color of a hit point of the reflection ray 60, and whether the shadow ray 50 reaches the light source 80.

The ray tracing apparatus 100 constructs the image plane 15 by performing the above process on all of the pixels of the image plane 15.

Figure 2:
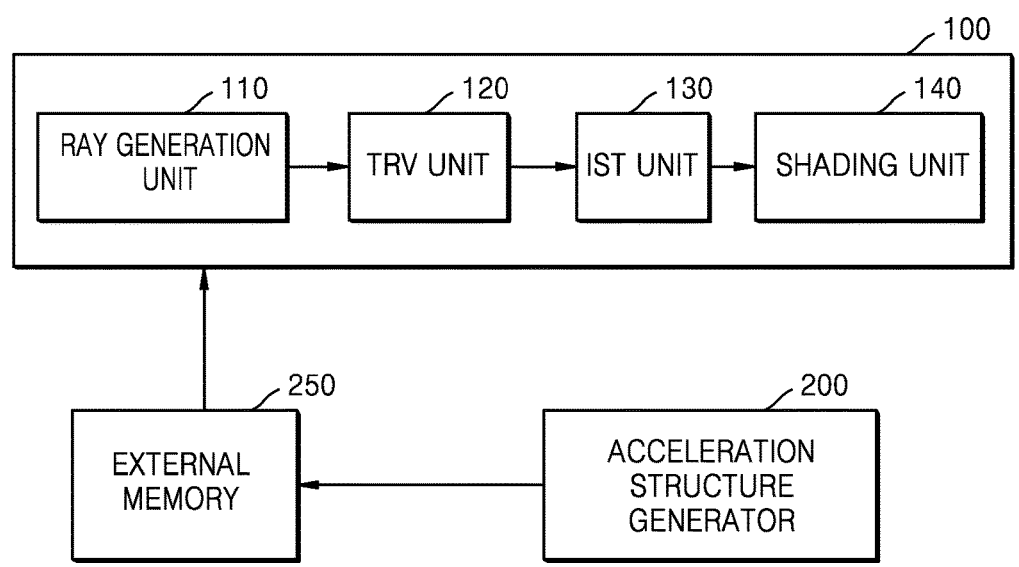
FIG. 2 is a block diagram illustrating an example of a ray tracing system.

FIG. 2 is a block diagram illustrating an example of a ray tracing system 20.

Referring to FIG. 2, the ray tracing system 20 includes the ray tracing apparatus 100, an external memory 250, and an acceleration structure (AS) generator 200.

The ray tracing apparatus 100 includes a ray generation unit 110, a traversal (TRV) unit 120, an intersection test (IST) unit 130, and a shading unit 140.

The ray generation unit 110 generates a primary ray and rays that are derived from the primary ray. The ray generation unit 110 generates a primary ray from the viewpoint 10, and generates a secondary ray at a hit point between the primary ray and an object as described with reference to FIG. 1. The secondary ray may be a reflection ray, a refraction ray, or a shadow ray generated at the hit point between the primary ray and the object.

Also, the ray generation unit 110 may generate a tertiary ray at a hit point between the secondary ray and an object. The ray generation unit 110 may continue to generate a ray until no further ray intersects an object, or may generate a ray a predetermined number of times.

The TRV unit 120 receives information about the ray generated by the ray generation unit 110. The generated ray includes the primary ray and any rays (e.g., the secondary ray, the tertiary ray, etc.) that are derived from the primary ray.

For example, for the primary ray, the TRV unit 120 receives information about a viewpoint and a direction of the primary ray. Also, for the secondary ray, the TRV unit 120 receives information about a start point and a direction of the secondary ray. The start point of the secondary ray is the hit point between the primary ray and the object. The viewpoint and the start point may be expressed as coordinates, and the direction may be expressed as a vector.

The TRV unit 120 reads information about an AS from the external memory 250.

The AS is generated by the AS generator 200, and the generated AS is stored in the external memory 250.

The AS generator 200 generates the AS including position information of objects in a 3D space. The AS generator 200 divides the 3D space in a hierarchical tree shape. The AS generator 200 may generate the AS having any of various shapes. For example, the AS generator 200 may generate the AS indicating a relationship of the objects in the 3D space using a k-dimensional (kd) tree, a bounding volume hierarchy (BVH), or a grid.

The AS includes a root node, an inner node, a leaf node, and a primitive. The term 'root node' refers to an uppermost node that does not have a parent node and only has a child node. The term 'inner node' refers to a node that has both a parent node and a child node. The term 'leaf node' refers to a lowermost node that does not have a child node and only has a parent node. The leaf node may include primitives therein.

The TRV unit 120 detects a leaf node that intersects a ray by traversing the read information about the AS.

The IST unit 130 receives the leaf node that intersects the ray from the TRV unit 120.

The IST unit 130 reads, from the external memory 250, information (geometry data) about primitives included in the received leaf node.

The IST unit 130 performs an intersection test between the ray and each of the primitives based on the read information about the primitives.

For example, the IST unit 130 determines which primitive among the primitives included in the leaf node received from the TRV unit 120 intersects the ray.

Accordingly, the IST unit 130 detects a primitive that intersects the ray, and calculates a hit point between the detected primitive and the ray.

The calculated hit point is output as coordinates to the shading unit 140.

The shading unit 140 determines a color value of a pixel based on information about the hit point and characteristics of a material of the hit point. The shading unit 140 determines the color value of the pixel by taking into account a basic color of the material of the hit point and an effect of a light source.

For the example in FIG. 1, the shading unit 140 determines a color value of the pixel A by taking into account the effects of the primary ray 40, and the refraction ray 70, the reflection ray 60, and the shadow ray 50 that are secondary rays.

The ray tracing apparatus 100 receives data needed for ray tracing from the external memory 250. The external memory 250 stores the AS or geometry data.

The AS is generated by the AS generator 200 and is stored in the external memory 250.

The geometry data is information about primitives. The primitives may be polygons, for example, triangles or quadrangles or other polygons, and the geometry data may include information about positions and vertices of the primitives included in an object. For example, when the primitives are triangles, the geometry data may include vertex coordinates, normal vectors, and texture coordinates of the triangles.

The ray tracing apparatus 100 detects a leaf node that intersects a ray by traversing the AS. The ray tracing apparatus 100 traverses the AS along one path, and when a traversal process along that path ends, traverses the AS along another path. When the AS is traversed along a path, the ray tracing apparatus 100 may store, in a stack, information about a node that is not traversed to improve traversal efficiency. The stack may be a temporary storage device included in the ray tracing apparatus 100, but is not limited thereto, and the stack may be disposed outside the ray tracing apparatus 100 and may communicate with a plurality of modules included in the ray tracing apparatus 100.

Figures 3, 4:
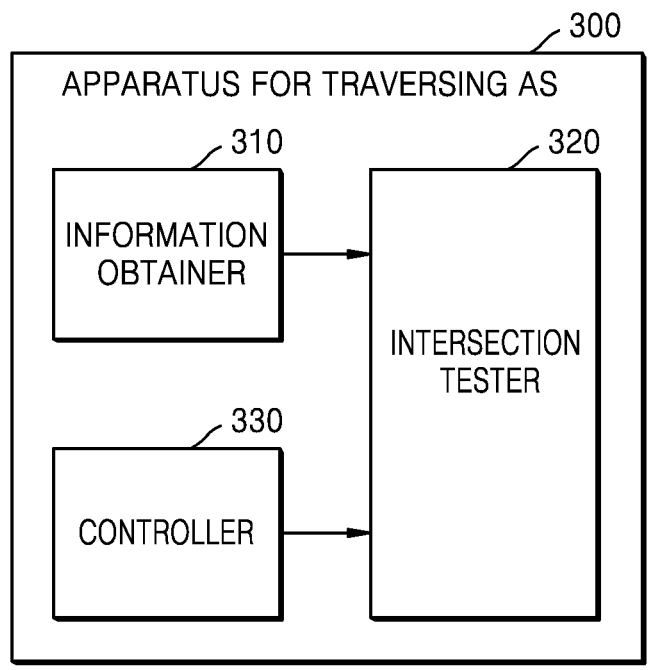
FIG. 3 is a block diagram illustrating an example of an apparatus for traversing an acceleration structure (AS) in the ray tracing system.
FIG. 4 is a view for explaining an example of a data structure in which information about child nodes of a target node is stored.

FIG. 3 is a block diagram illustrating an example of an apparatus 300 for traversing an AS in the ray tracing system 20.

Referring to FIG. 3, the apparatus 300 includes an information obtainer 310, an intersection tester 320, and a controller 330.

The information obtainer 310, the intersection tester 320, and the controller 330 of FIG. 3 that are used to traverse the AS may be included in the TRV unit 120 of FIG. 2. However, this example is not limited thereto.

The information obtainer 310 obtains information about a plurality of child nodes of a target node included in the AS. The target node may be an inner node or a root node. The information obtainer 310 obtains information about the plurality of child nodes of the target node to determine a node to be traversed next (hereinafter, referred to as a next target node).

The information obtainer 310 starts to traverse the AS beginning from a root node. In one example, the root node has a plurality of child nodes. In this example, the information obtainer 310 obtains information about the plurality of child nodes of the root node to determine a next target node of the root node.

In another example, when the root node is a leaf node that does not have a child node, the information obtainer 310 controls the AS generator 200 to divide at least one primitive included in the leaf node and generate a child node. When the AS generator 200 generates a child node by dividing at least one primitive included in the leaf node, the information obtainer 310 obtains information about the generated child node.

Information about child nodes of the target node include information needed to determine a next target node. In one example, the information about the child nodes of the target node includes memory addresses in which the child nodes are stored, indices indicating the child nodes, type information of the child nodes, and bounding box information of the child nodes. The term 'bounding box' refers to a smallest hexahedral space that includes an object that independently moves in a 3D space.

The information about the child nodes of the target node will now be explained in detail with reference to FIG. 4.

FIG. 4 is a view for explaining an example of a data structure 400 in which information about child nodes of a target node is stored.

Referring to FIG. 4, the information about the child nodes of the target node is included in the data structure 400 that is preset. For example, the information about the child nodes of the target node includes identification information 414 and 416 for identifying the child nodes. When the child nodes are inner nodes, the identification information 414 and 416 is index information indicating the child nodes. When the child nodes are leaf nodes, the identification information 414 and 416 indicates start indices of primitives included in the child nodes.

When the child nodes are leaf nodes, to indicate the number of primitives included in the child nodes, the information about the child nodes of the target node includes primitive number information 422 and 424 indicating the number of primitives of the child nodes. When the child nodes are inner nodes, the primitive number information 422 and 424 are set to 0.

The information about the child nodes of the target node include bounding box information 432 and 434 of the child nodes. Also, the information about the child nodes of the target node further includes information 412 about a parent node of the target node. However, the information about the child nodes of the target node is not limited to the above information, but may include information other than the above information.

In one example, the information obtainer 310 simultaneously obtains information about child nodes included in the preset data structure 400. In this case, the information obtainer 310 does not need to repeatedly traverse the target node to obtain the information about the child nodes of the target node. The information obtainer 310 may traverse the child nodes based on memory addresses 412 and 414 in which the child nodes are stored, and may identify the child nodes based on primitive number information 422 and 424 that indicate the child nodes. When the target node is an inner node, the primitive number information 422 and 424 that indicate the child nodes may each indicate at least one primitive included in the target node.

Also, the information obtainer 310 may obtain type information of the child nodes and bounding box information 432 and 434 of the child nodes, and may provide information for determining a node to be traversed next and an operation to be performed on the node to be traversed next in only one traversal process.

A case where the target node has two child nodes will be explained as an example for simplicity, but the target node may have more than two child nodes.

The intersection tester 320 determines whether each of the plurality of child nodes intersects a ray based on the obtained information about the plurality of child nodes. The intersection tester 320 may simultaneously determine whether bounding boxes of the child nodes intersect the ray based on the bounding box information of the child nodes.

In one example, the intersection tester 320 simultaneously determines whether the bounding boxes of the child nodes intersect the ray. For example, based on the bounding box information of a first child node and the bounding box information of a second child node, the intersection tester 320 simultaneously determines whether a bounding box of the first child node and a bounding box of the second child node intersect the ray.

Even when three or more child nodes are included in the target node, the intersection tester 320 may simultaneously determine whether the child nodes intersect the ray. However, this is merely one example, and in another example, some child nodes among the plurality of child nodes are grouped in a preset order, and the intersection tester 320 determines whether bounding boxes of the grouped child nodes intersect the ray.

The controller 330 determines a next target node among at least one child node that intersects the ray. The controller 330 obtains information about the at least one child node that intersects the ray from the intersection tester 320.

When two or more child nodes intersect the ray, the controller 330 determines a next target node based on an intersection distance. For example, when an intersection distance between the first child node and the ray is less than an intersection distance between the second child node and the ray, the controller 330 determines the first child node as a next target node.

Also, the controller 330 may store, in a stack, child nodes that are not determined as the next target node among the child nodes that intersect the ray. For example, the controller 330 may store, in the stack, the second child node that is not determined as the next target node among the first child node and the second child node.

The controller 330 performs an operation corresponding to a type of the determined next target node. In one example, the controller 330 determines the type of the determined next target node. Examples of the type of the target node include an inner node and a leaf node. When the next target node is an inner node, the controller 330 transmits information about the type of the next target node to the information obtainer 310 and the above process is performed again.

For example, when the next target node is an inner node A, the controller 330 determines the inner node A as the target node and transmits information about the inner node A to the information obtainer 310. The information obtainer 310 determines the inner node A as the target node and obtains information about child nodes of the inner node A. The intersection tester 320 performs an intersection test on each of the child nodes of the inner node A based on the obtained information about the child nodes of the inner node A. The controller 330 extracts at least one child node that intersects a ray among the child nodes of the inner node A and determines a next target node among the extracted at least one child node.

When the next target node is a leaf node B, the controller 330 transmits information about the leaf node B to the IST unit 130 (see FIG. 2). The IST unit 130 repeatedly performs an intersection test to determine whether each of at least one primitive included in the leaf node B intersects a ray. Alternatively, the controller 330 controls the external memory 250 to transmit information about the at least one primitive included in the leaf node B stored in the external memory 250 to the IST unit 130.

When there is no next target node, the controller 330 ends a series of traversal processes and transmits a result of the traversal processes to the shading unit 140. The shading unit 140 determines a color value of a pixel corresponding to the ray based on information of a hit point between the ray and each of the primitives and characteristics of a material of the hit point. The shading unit 140 determines the color value of the pixel by taking into account a basic color of the material of the hit point, an effect of a light source, and any other factor affecting the color value of the pixel.

When there is no child node that intersects the ray among the plurality of child nodes, the controller 330 extracts another node stored in the stack and determines the other node as a next target node. The other node may be any one node among nodes that are not subordinate to the target node in the AS. For example, the controller 330 determines a node having the same parent node as that of the target node as a next target node in the AS.

Figure 5:
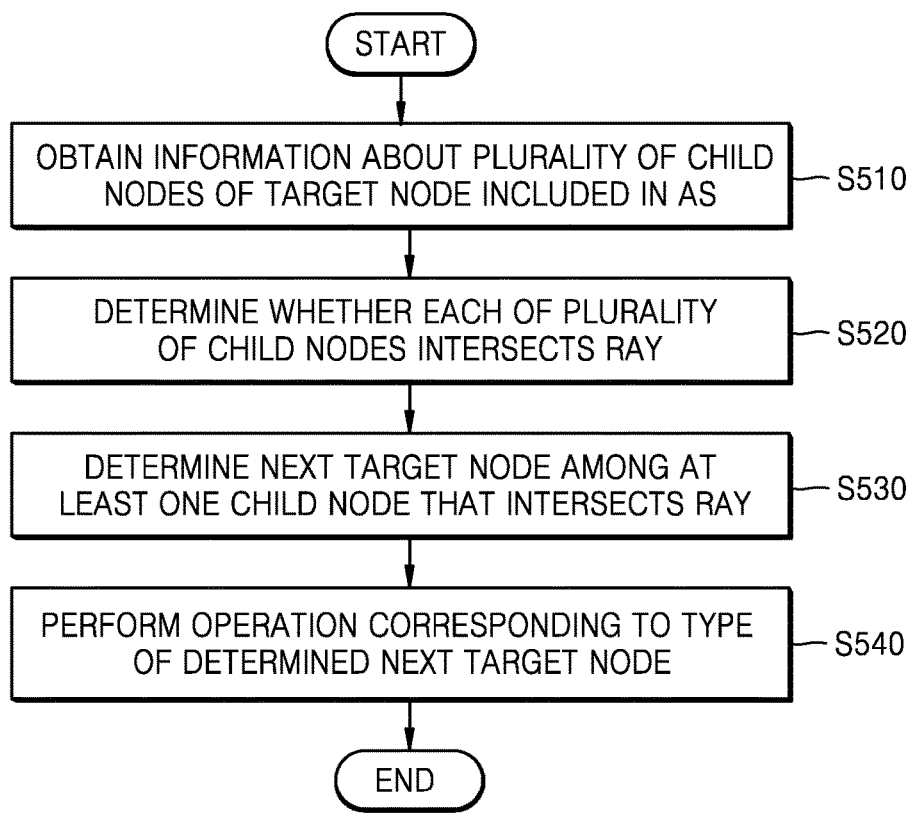
FIG. 5 is a flowchart of an example of a method of traversing an AS in the ray tracing system.

FIG. 5 is a flowchart of an example of a method of traversing an AS in the ray tracing system 20.

In operation S510, the apparatus 300 obtains information about a plurality of child nodes of a target node included in the AS. The target node may be an inner node or a root node. The apparatus 300 obtains the information about the plurality of child nodes of the target node to determine a node (hereinafter, referred to as a next target node) to be traversed next. The information about the child nodes may include memory addresses in which the child nodes are stored, indices indicating the child nodes, type information of the child nodes, and bounding box information of the child nodes.

In operation S520, the apparatus 300 determines whether each of the plurality of child nodes intersects a ray. In one example, the apparatus 300 simultaneously determines whether bounding boxes of the child nodes intersect the ray. The apparatus 300 may simultaneously determine whether the plurality of child nodes intersect the ray in one traversal process based on the obtained information about the plurality of child nodes, thereby reducing a time taken to perform traversal.

In operation S530, the apparatus 300 determines a next target node among at least one child node that intersects the ray. When two or more child nodes intersect the ray, the apparatus 300 determines the next target node based on an intersection distance. For example, the apparatus 300 determines a child node having the shortest intersection distance to the ray among the plurality of child nodes that intersect the ray as the next target node. The apparatus 300 may store, in a stack, child nodes that are not determined as the next target node among the plurality of child nodes that intersect the ray.

In operation S540, the apparatus 300 performs an operation corresponding to a type of the determined next target node. The apparatus 300 determines the type of the determined next target node. Examples of the type of the target node include an inner node and a leaf node. When the next target node is an inner node, the apparatus 300 repeatedly performs operations S510 through S540 on the next target node.

When the next target node is a leaf node, the apparatus 300 transmits information about the next target node to the IST unit 130 (see FIG. 2). The IST unit 130 repeatedly performs an intersection test to determine whether each of at least one primitive included in the next target node intersects the ray.

When there is no next target node, the apparatus 300 ends a series of traversal processes and transmits a result of the traversal processes to the shading unit 140.

Figure 6:
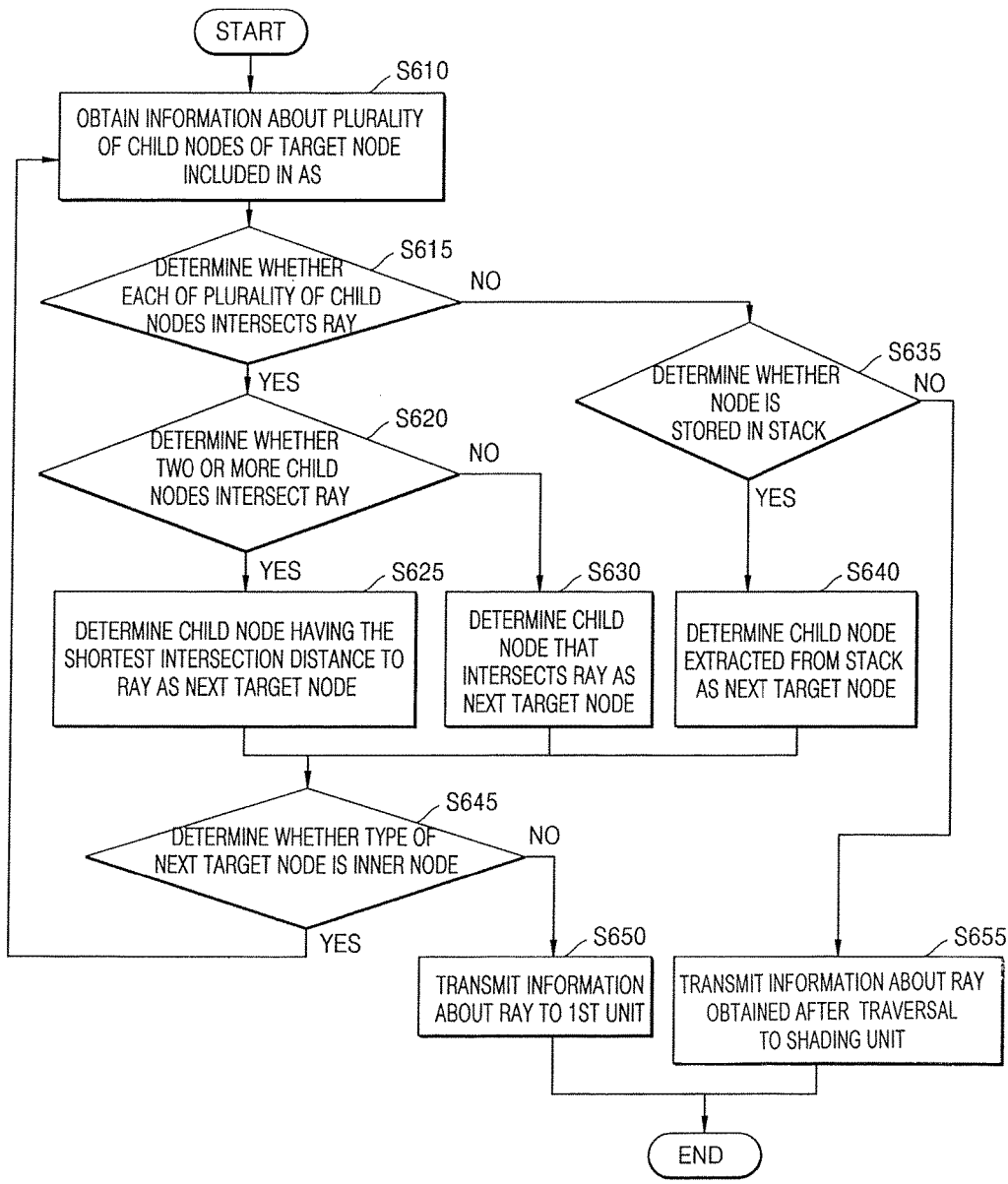
FIG. 6 is a detailed flowchart for explaining an example of how the apparatus performs an operation corresponding to a type of a child node that intersects a ray.

FIG. 6 is a detailed flowchart for explaining an example of how the apparatus 300 performs an operation corresponding to a type of a child node that intersects a ray.

In operation S610, the apparatus 300 obtains information about a plurality of child nodes of a target node included in an AS. The target node may be an inner node or a root node. Operation S610 corresponds to operation S510 in FIG. 5.

In operation S615, the apparatus 300 determines whether each of the plurality of child nodes intersects a ray. The apparatus 300 may simultaneously determine whether the plurality of child nodes intersect the ray based on the obtained information about the plurality of child nodes.

In operation S620, the apparatus 300 determines whether two or more child nodes intersect the ray.

In operation S625, the apparatus 300 determines a child node having the shortest intersection distance to the ray among the two or more child nodes that intersect the ray as a next target node. The apparatus 300 stores, in a stack, child nodes that are not determined as the next target node among the two or more child nodes that intersect the ray.

In operation S630, the apparatus 300 determines one child node that intersects the ray as the next target node. If it is determined in operation S620 that only one child node intersects the ray, the apparatus 300 determines the one child node as the next target node.

In operation S635, the apparatus 300 determines whether a node is stored in the stack. If it is determined in operation S620 that no child node intersects the ray, the apparatus 300 determines whether another node is stored in the stack. The other node may be any node that is not subordinate to the target node in the AS.

In operation S640, the apparatus 300 determines a node extracted from the stack as the next target node. When a child node is stored in the stack, the apparatus 300 extracts the child node from the stack. The apparatus 300 determines the extracted child node as the next target node.

In operation S645, the apparatus 300 determines whether a type of the determined next target node is an inner node. If the type of the determined next target node is an inner node, the apparatus 300 changes the next target node to a target node, returns to operation S610, and repeatedly performs the above processes. For example, if the determined next target node is the inner node A, the apparatus 300 sets the inner node A as a target node, and obtains information about child nodes of the inner node A in operation S610. Subsequent processes are the same as operations S615 through S645.

In operation S650, the apparatus 300 transmits information about the ray to the IST unit 130. When the type of the determined next target node is a leaf node (the NO branch of operation S645, the apparatus 300 transmits the information about the ray to the IST unit 130. The IST unit 130 determines whether each of primitives included in the next target node intersects the ray.

In operation 655, the apparatus 300 transmits the information about the ray to the shading unit 140. When there is no node to be traversed in the AS, the apparatus 300 transmits the information about the ray obtained after traversal to the shading unit 140. The information obtained after traversal includes intersection information between the ray and each of objects included in a 3D space, or each of primitives included in each of the objects. The shading unit 140 determines a color value of a pixel corresponding to the ray based on information about a hit point between the ray and each of the primitives and characteristics of a material of the hit point. The shading unit 140 determines the color value of the pixel by taking into account a basic color of the material of the hit point, an effect of a light source, and any other factor affecting the color value of the pixel.

Figure 7:
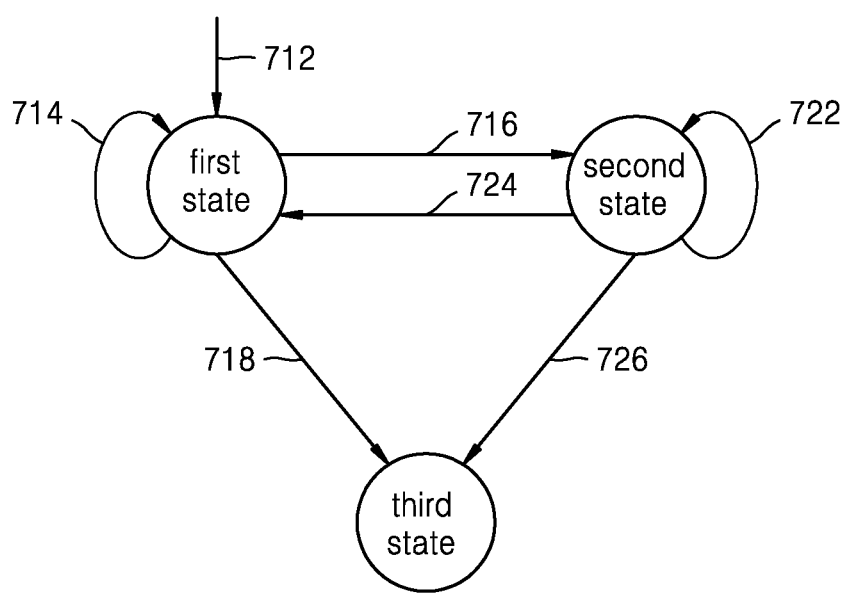
FIG. 7 is a diagram illustrating examples of states of the ray tracing system.

FIG. 7 is a diagram illustrating examples of states of the ray tracing system 20.

In the example in FIG. 7, the ray tracing system 20 has a first state, a second state, and a third state. The first state is a state in which nodes included in an AS are traversed. The second state is a state in which an intersection test is performed on each of primitives included in leaf nodes among the nodes included in the AS. The third state is a state in which when all of the nodes included in the AS have been traversed, a color value of a pixel is determined based on intersection information obtained during a traversal process, and the traversal process of the nodes ends.

Since the ray tracing system 20 simultaneously performs an intersection test on a plurality of child nodes of a target node, states of the ray tracing system 20 may be simplified into three states as described above.

A state change in an example of the ray tracing system 20 will now be explained with reference to FIG. 7.

In operation 712, the apparatus 300 obtains information about child nodes of a root node.

In operation 714, when it is determined based on the obtained information that a next target node is an inner node, the apparatus 300 obtains information about child nodes of the next target node. When the next target node is an inner node, operations 712 and 714 are repeated.

In operation 716, when the next target node is a leaf node, the apparatus 300 transmits information about the leaf node to the IST unit 130.

In operation 718, when there is no next target node, the apparatus 300 ends a traversal process and transmits a result of the traversal process to the shading unit 140.

Operations 712 through 718 are performed in the first state of the ray tracing system 20.

In operation 722, the IST unit 130 repeatedly performs an intersection test on at least one primitive included in the leaf node. The IST unit 130 determines whether there is a hit point between the ray and the at least one primitive, compares an intersection distance of the hit point with an intersection distance of a previous hit point, and selects a hit point having a shorter intersection distance among the hit point and the previous hit point.

In operation 724, the IST unit 130 ends the intersection test performed on the leaf node and returns to the first state to traverse a next target node.

In operation 726, the IST unit 130 ends the intersection test performed on the leaf node, and when there is no child node stored in a stack, transmits a result of the intersection test to the shading unit 140.

Operations 722 through 726 are performed in the second state of the ray tracing system 20.

In the third state of the ray tracing system 20, a color value corresponding to the ray is determined based on intersection information obtained by the shading unit 140.

Figure 8:
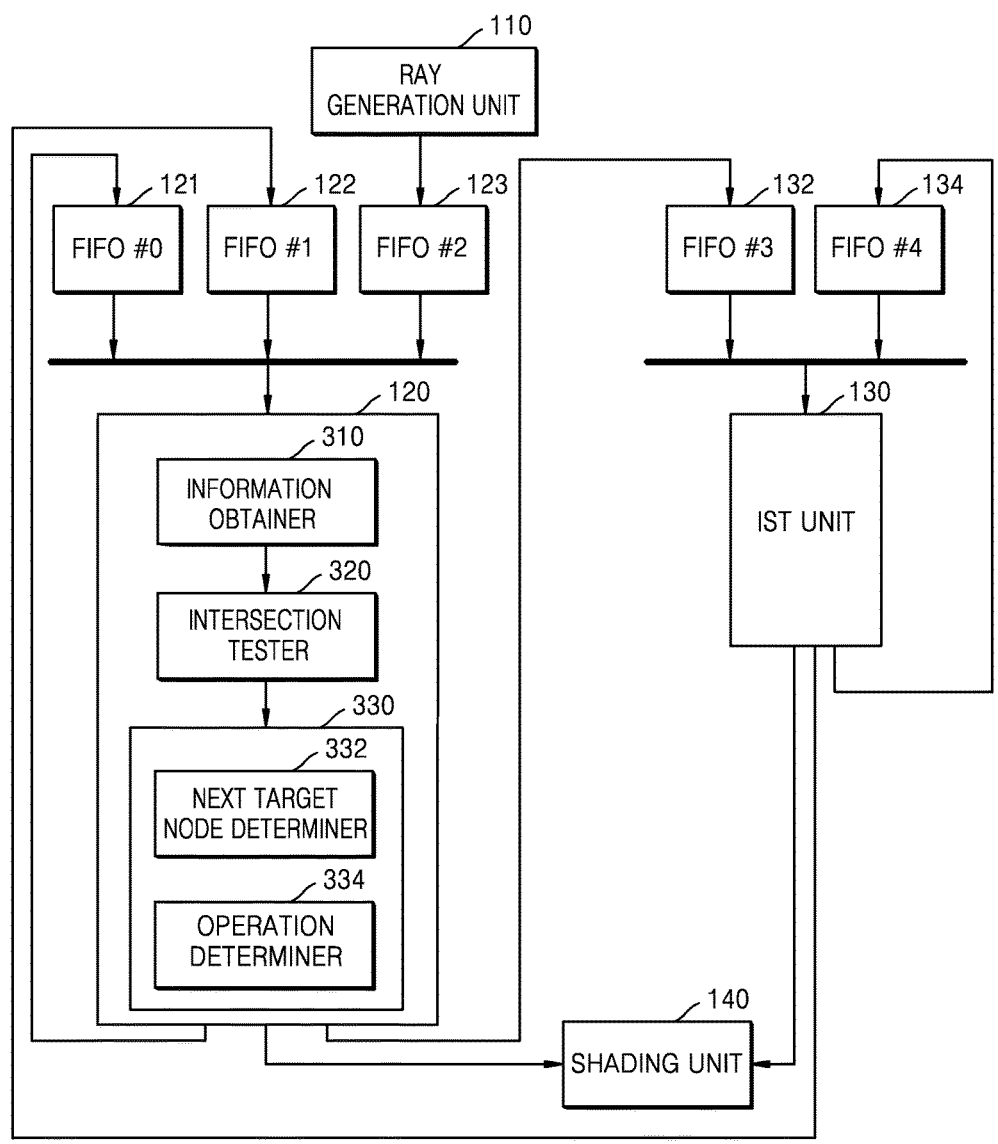
FIG. 8 is a detailed block diagram illustrating an example of the apparatus in the ray tracing system, Throughout the drawings and the detailed description, the same reference numerals refer to the same elements. The drawings may not be to scale, and the relative size, proportions, and depiction of elements in the drawings may be exaggerated for clarity, illustration, and convenience.

FIG. 8 is a detailed block diagram illustrating an example of the apparatus 300 in the ray tracing system 20.

The ray tracing system 20 includes a plurality of FIFO units, for example, zeroth to fourth FIFO units 121, 122, 123, 132, and 134, the ray generation unit 110, the TRV unit 120, the IST unit 130, and the shading unit 140. A case where an example of the apparatus 300 is included in the TRV unit 120 will now be explained with reference to FIG. 8.

The ray generation unit 110 generates a primary ray and rays that are derived from the primary ray. The ray generation unit 110 generates the primary ray and a secondary ray at a hit point between the primary ray and an object. The secondary ray may be a reflection, refraction, or shadow ray generated at the hit point between the primary ray and the object.

The ray generation unit 110 may continue to generate a ray until no further ray intersects the object, or may generate a ray a predetermined number of times.

The TRV unit 120 receives information about the ray generated by the ray generation unit 110. In the example in FIG. 8, the TRV unit 120 is connected to three FIFO units for receiving an input. The TRV unit 120 receives a new ray from the ray generation unit 110 through the second FIFO unit 123. Also, the TRV unit 120 may obtain information for traversing a next node through the zeroth FIFO unit 121. The TRV unit 120 may obtain the information for traversing the next node through the first FIFO unit 122 after intersection testing by the IST unit 130 ends.

The ray generated by the ray generation unit 110 includes a primary ray and rays (e.g., a secondary ray, a tertiary ray, etc.) that are derived from the primary ray. How the example of the apparatus 300 included in the TRV unit 120 traverses a plurality of nodes will now be explained.

In the example in FIG. 8, the apparatus 300 included in the TRV unit 120 includes the information obtainer 310, the intersection tester 320, and the controller 330, and the controller 330 includes a next target node determiner 332 and an operation determiner 334.

The information obtainer 310 obtains information about a plurality of child nodes of a target node included in an AS. The target node may be an inner node or a root node. The intersection tester 320 determines whether each of the plurality of child nodes intersects a ray. The intersection tester 320 simultaneously determines whether the plurality of child nodes intersect the ray in one traversal process based on the obtained information about the plurality of child nodes, thereby reducing a time taken to perform traversal.

The next target node determiner 332 determines a next target node among at least one child node that intersects the ray. When two or more child nodes intersect the ray, the next target node determiner 332 determines the next target node based on an intersection distance.

The operation determiner 334 performs an operation corresponding to a type of the determined next target node. The operation determiner 334 determines the type of the determined next target node. Examples of the type of the target node include an inner node and a leaf node.

When the operation determiner 334 determines that the next target node is an inner node, the information obtainer 310 obtains information about the next target node through the zeroth FIFO unit 121.

When the next target node is a leaf node, the operation determiner 334 transmits information about the next target node to the IST unit 130 (see FIG. 2) through the third FIFO unit 132. The IST unit 130 repeatedly performs an intersection test through the fourth FIFO unit 134 to determine whether each of at least one primitive included in the next target node intersects the ray. The IST unit 130 detects primitives that intersect the ray and calculates a hit point between each of the detected primitives and the ray.

The calculated hit point is output as coordinates to the shading unit 140.

According to the examples described above, a processing speed of an AS traversal process is increased, and thus a time taken to perform the AS traversal process is reduced, thereby making it possible to efficiently perform an intersection test between a ray and each child node.

The ray tracing apparatus 100, the ray generation unit 110, the traversal (TRV) unit 120, the zeroth through fourth FIFO units 121, 122, 123, 132, and 134, the intersection test (IST) unit 130, the shading unit 140, the acceleration structure generator 200, the external memory 250, the apparatus 300 for traversing an AS, the information obtainer 310, the intersection tester 320, the controller 330, the next target node determiner 332, the operation determiner 334 illustrated in FIGS. 2, 3, and 8 that perform the operations described herein with respect to FIGS. 1-8 are implemented by hardware components. Examples of hardware components include controllers, generators, drivers, memories, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-8. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5-7 that perform the operations described herein with respect to FIGS. 1-8 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-based image rendering method of traversing an acceleration structure (AS) in a ray tracing system, the method comprising:
   obtaining, by at least one processor, information from a data structure about child nodes of a target node included in an acceleration structure (AS) in which the obtained information is preset in the data structure, wherein the data structure is generated by an AS generator, is stored in an external memory and includes memory addresses at which the child nodes are stored, indices indicating the child nodes, type information of the child nodes and bounding box information of the child nodes;
   determining, simultaneously, by the at least one processor, whether each of the child nodes intersects a ray based on the obtained information;
   determining, by the at least one processor, a next target node to be traversed and an operation to be performed thereon among at least one child node that intersects the ray after the determining of whether each of the child nodes intersects the ray; and
   performing, by the at least one processor, an operation corresponding to a type of the determined next target node,
   wherein the simultaneously determining whether each of the child nodes intersect the ray based on the obtained information from the data structure is performed in one traversal process.

2. The method of claim 1, wherein the determining of whether each of the child nodes intersects the ray comprises simultaneously performing intersection determinations respectively determining whether each of the child nodes intersect the ray based on the obtained information.

3. The method of claim 1, wherein the determining of whether each of the child nodes intersects the ray comprises simultaneously performing intersection determinations respectively determining whether a first child node and a second child node intersect the ray based on obtained information about the first child node and the second child node.

4. The method of claim 1, wherein the determining of the next target node comprises:
   in response to there being only one child node that intersects the ray, determining the one child node as the next target node; and
   in response to there being two or more child nodes that intersect the ray, determining a child node having a shortest intersection distance to the ray among the two or more child nodes as the next target node.

5. The method of claim 1, wherein the determining of the next target node comprises, in response to there being no child node that intersects the ray:
   extracting from the AS any one node among nodes that are not subordinate to the target node; and
   determining the extracted node as the next target node.

6. The method of claim 1, wherein the performing of the operation corresponding to the type of the determined next target node comprises:
   in response to the next target node being an inner node, moving to at least one child node of the next target node; and
   in response to the next target node being a leaf node, performing an intersection test to determine whether at least one primitive included in the leaf node intersects the ray.

7. The method of claim 6, wherein the performing of the operation corresponding to the type of the determined next target node further comprises, based on a result of the intersection test, traversing another child node that intersects the ray.

8. The method of claim 6, the determining of whether the at least one primitive included in the leaf node intersects the ray comprises determining whether a preset bounding box of the at least one primitive included in the leaf node intersects the ray.

9. The method of claim 1, further comprising, in response to the target node included in a root node being a leaf node:
   dividing at least one primitive included in the target node; and
   generating a child node of the target node based on the divided at least one primitive.

10. A non-transitory computer-readable storage medium storing instructions for causing a computer to perform the method of claim 1.

11. A processor-based image rendering apparatus for traversing an acceleration structure (AS) in a ray tracing system, the apparatus comprising:
    at least one processor configured to execute ray tracing operations that include:
       obtain information from a data structure about child nodes of a target node included in the AS in which the obtained information is preset in the data structure, wherein the data structure is generated by an AS generator, is stored in an external memory and includes memory addresses at which the child nodes are stored, indices indicating the child nodes, type information of the child nodes and bounding box information of the child nodes;
       simultaneously determine whether each of the child nodes intersects a ray based on the obtained information in the data structure;
       determine a next target node among at least one child node that intersects the ray, and perform an operation corresponding to a type of the determined next target node, and
       render an image for display based on a pixel value of the image generated based on the performed operation,
    wherein the simultaneously determining whether each of the child nodes intersect the ray based on the obtained information from the data structure is performed in one traversal process.

12. The apparatus of claim 11, wherein the at least one processor simultaneously determines whether each of the child nodes intersects the ray by simultaneously performing intersection determinations respectively determining whether each of the child nodes intersect the ray based on the obtained information.

13. The apparatus of claim 11, wherein the at least one processor simultaneously determines whether each of the child nodes intersects the ray includes by simultaneously performing intersection determinations respectively determining whether a first child node and a second child node intersect the ray based on obtained information about the first child node and the second child node.

14. The apparatus of claim 11, wherein, to determine the next target node, the at least one processor is further configured to:
   in response to there being only one child node that intersects the ray, determine the one child node as the next target node; and
   in response to there being two or more child nodes that intersect the ray, determine a child node having a shortest intersection distance to the ray among the two or more child nodes as the next target node.

15. The apparatus of claim 11, wherein, to determine the next target node, the at least one processor is further configured to, in response to there being no child node that intersects the ray, extract any one node among nodes that are not subordinate to the target node from the AS, and determine the extracted node as the next target node.

16. The apparatus of claim 11, wherein the at least one processor is further configured to:
   in response to the next target node being an inner node, move to at least one child node of the next target node; and
   in response to the next target node being a leaf node, perform an intersection test to determine whether at least one primitive included in the leaf node intersects the ray.

17. The apparatus of claim 16, wherein the at least one processor is further configured to, based on a result of the intersection test, traverse another child node that intersects the ray.

18. The apparatus of claim 16, wherein the at least one processor is further configured to determine whether the least one primitive included in the leaf node intersects the ray by determining whether a preset bounding box of the at least one primitive included in the leaf node intersects the ray.

19. The apparatus of claim 11, wherein the at least one processor is further configured to, in response to the target node included in a root node being a leaf node, divide at least one primitive included in the target node, and generate a child node of the target node based on the divided at least one primitive.

20. An apparatus for traversing an acceleration structure (AS) in a ray tracing system, the apparatus comprising:
   at least one processor configured to execute ray tracing operations that include:
   simultaneously obtain information from a data structure about all child nodes of a target node included in the AS, in which the information is preset in the data structure, wherein the data structure is generated by an AS generator, is stored in an external memory and includes memory addresses at which the child nodes are stored, indices indicating the child nodes, type information of the child nodes and bounding box information of the child nodes;
   simultaneously determine whether each of the child nodes intersects a ray based on the information obtained for the child nodes by one traversal of the target node,
   perform an operation corresponding to a type of one of the child nodes intersected by the ray, and
   render an image based on a pixel value of the image generated based on the performed operation.

* * * * *